April 25, 1967  H. P. BUBERNIAK  3,315,942
JACK MEANS FOR A CAMPER UNIT
Filed Sept. 20, 1965
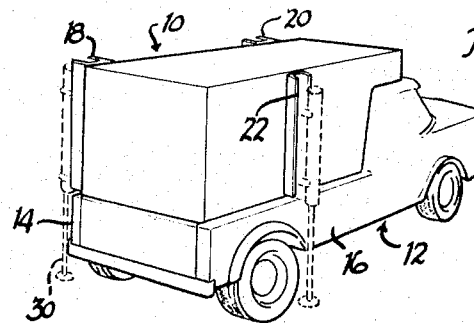
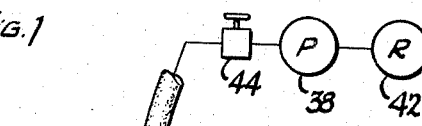
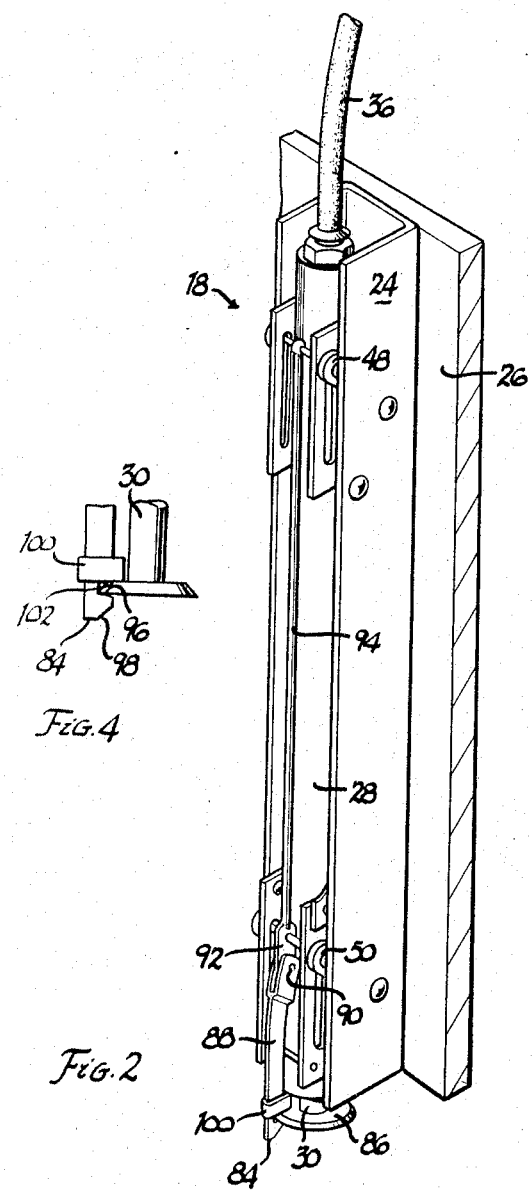
Inventor:
HARRY P. BUBERNIAK
By
Wilson, Settle, Batchelder & Craig
Attys.

United States Patent Office 3,315,942
Patented Apr. 25, 1967

3,315,942
JACK MEANS FOR A CAMPER UNIT
Harry P. Buberniak, 12342 Devoe,
Southgate, Mich. 48192
Filed Sept. 20, 1965, Ser. No. 488,442
8 Claims. (Cl. 254—45)

The present invention relates to jack means for a camper unit, and more particularly to jack means which, when actuated, move laterally to clear the vehicle upon which the camper unit is transported.

The type of camper unit to which the present invention pertains is becoming increasingly popular for use by sportsmen and other outdoor enthusiasts. The camper unit is a shelter of the type having a relatively fixed construction similar to a wheeled trailer as opposed to collapsible shelters such as canvas tents. The camper unit is a generally rectangular structure and is designed to be carried in the bed of a pickup truck. Jack means are provided on the side of the camper unit for loading and unloading the unit from the truck. When the camper reaches its destination, he simply unloads the camper unit from the truck and then is free to use the truck for transportation.

Some camper units are designed to be of a width substantially equal to the width of the truck bed. The side wall structure of the truck bed extends laterally outwardly from the side walls of the camper unit. The jack for loading and unloading the camper unit has heretofore been mounted on projections on the side of the camper so that the extensible leg of the jack would clear the side walls of the truck. This has been undesirable both from the appearance standpoint and from the operational standpoint in that the projecting structure creates wind resistance when the vehicle is being driven and also in that the projecting structure undesirably increases the overall effective width of the vehicle.

This problem is solved in accordance with the present invention by providing a jack structure which, when actuated, initially moves laterally to permit the extensible leg of the jack to clear the side wall of the truck.

It is therefore an object of the present invention to provide jack means for a camper unit in which means are provided to move the extensible leg of the jack laterally upon actuation of the jack to clear the side walls of the vehicle upon which the camper is loaded.

Another object of the invention is to provide a jack with an extensible leg with linkage operatively connected to the extensible leg to move the leg and associated structure laterally upon extension of the leg.

A further object of the invention is to provide means which automatically cause lateral movement of the extensible leg and associated structure upon extension or retraction of the leg.

A still further object of the invention is to provide a fluid operated jack which includes a support and an extensible leg and cam means for engaging the leg which are operable to move the leg laterally of the support upon either extension or retraction of the leg.

Other objects of this invention will appear in the following description and appended claims, reference being had to the accompanying drawings forming a part of this specification wherein like reference characters designate corresponding parts in the several views.

In the drawing:

FIGURE 1 is an end perspective view of a pickup truck having loaded thereon a camper unit on which is mounted jack means in accordance with one embodiment of the present invention;

FIGURE 2 is a perspective view of a jack means in the inactive or retracted condition;

FIGURE 3 is a perspective view similar to FIGURE 2 illustrating the extensible leg of the jack in the extended position; and FIGURE 4 is an enlarged view of the cam means for engagement with the extensible leg of the jack for moving the leg laterally of its support.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to FIGURE 1, it will be noted that a generally rectangular camper unit 10 is illustrated as being carried in the bed of a pickup truck 12. The camper unit 10 has a relatively rigid construction and serves as a shelter. The camper unit may contain bunks, cooking facilities and the like usually provided in such units.

It will be noted that the width of the camper unit 10 is somewhat less than the overall width of the truck 12. The side walls 14, 16 of the truck extend laterally outwardly from the side walls of the camper unit.

Three jacks 18, 20, 22 are provided on the side walls of the camper unit 10. The jacks 18, 20 are provided at one wall adjacent the corners of the camper unit. The jack 22 is provided on the opposite wall and is approximately centered between the jacks 18, 20. This arrangement provides a stable three point suspension for the camper unit when it is supported by the jacks.

Each jack has an extensible leg which is of a sufficient length to reach the ground and raise the camper unit 10 slightly above the truck bed to permit the truck to be driven out from under the camper unit. It will be appreciated that if the extensible legs of the jacks were directed straight downwardly, they would not clear the side walls 14, 16 of the truck. For this reason, the extensible legs and associated structure are initially moved laterally outwardly so that the extensible legs will clear the side walls of the truck.

The jack 18 is illustratively shown in FIGURES 2 and 3. Each of the jacks has the same structure.

The jack 18 includes a mounting support comprising an elongated channel member 24 which is secured to the side wall 26 of the camper unit. Pivotally mounted within the channel 24 is linkage means which support a sleeve or cylinder 28 in which is slidably mounted an extensible leg 30. As will be noted in FIGURE 3, the cylinder 28 has a bore 32 therethrough. The leg 30 carries a piston 34 on the upper end thereof. Hydraulic fluid is injected or discharged from the cylinder 28 by means of a conduit 36 extending from the upper end of the bore 32. The jack illustrated is a hydraulic jack. However, the jack may be actuated by pneumatic pressure or mechanically. The conduit 36 extends to a pump 38 which pumps liquid under pressure from a reservoir 42. A valve 44 is provided to permit holding the leg 30 in the extended position.

A coil spring 46 is provided in the cylinder 28 to drive the piston and extensible leg upwardly when the leg is to be retracted. As will be appreciated, the spring 46 is operative to discharge any liquid within the cylinder 28 back through the pump 38 to the reservoir 42.

The linkage heretofore mentioned connecting the cylinder 28 to the channel member 24 includes a pair of links 48, 50. These links are pivotally mounted at their inner ends 52, 54 to the side walls of the channel 24. The links are channel members and the outer ends thereof are out out to form forks 56, 58.

A U-shaped sleeve member 62, 64 is secured to the upper and lower ends of the cylinder 28. Each sleeve has a pair of elongated slots 66, 68, 70, 72 through which extend pins 74, 76. The pins 74, 76 are secured to the forks 56, 58. It will be appreciated from this structure that the cylinder 28 may move vertically with respect to the forked portions of the links 48, 50.

A third channel-shaped elongated link 78 completes the linkage structure. The link 78 is pivotally mounted at the inner end 80 in the channel 24 adjacent the upper portion of the channel and just beneath the link 48. The lower end of the link 78 is cut away to form a fork 82 which is pivotally mounted to the upper portion of the lower sleeve 64.

The links 48, 50, 78 which may collectively be referred to as stabilizing arms, permit limited lateral and upward movement of the cylinder 28. When the cylinder 28 is urged laterally as will hereinafter be described, the pivotal connection of the link 78 causes upward and lateral movement of the cylinder 28 along a path defined by a radius having as a center the pivotal connection 80 of the link 78. The links 48, 50, by virtue of the pin and slot connection with the sleeves 62, 64 permit lateral movement to the extent of the length of the links 48, 50.

The means for moving the cylinder 28 laterally comprise a cam 84 which engages the circular foot 86 of the leg 30. The cam 84 is carried on the end of an elongated arm 88. The arm 88 is pivotally mounted at 90 to a support 92 secured to the pin 76 of the lower link 50. It will be noted that a rod 94 extends between the pins 74, 76, so that the links 48, 50 will always move in unison.

The cam 84 has an upper cam surface 96 and a lower cam surface 98. A stop member 100 extends from the arm 88 and is spaced slightly above the cam surface 96. The stop has a substantially straight undersurface 102 and extends beyond the cam 84.

When the jack 18 is in the inactive or retracted position as illustrated in FIGURE 2, the foot 86 of the extensible leg is received in the space between the stop 100 and cam 84. When fluid pressure is exerted against the piston 34, the extensible leg 30 is driven downwardly. The foot 86 contacts the cam surface 96 and urges the cam downwardly. The cam surface 96 has a gradually sloping surface with the result that it will not slide relative to the foot 86 until a relatively high pressure is exerted thereagainst by the foot.

Consequently, as the leg 30 is initially extended downwardly, it carries with it the cam 84. The connection of the cam arm 88 with the sleeve 64 causes the cylinder 28 to move along with the leg 30. The movement of the cylinder 28 results in downward pivoting of the links 48, 50 and outward pivoting of the link 78. As heretofore described, pivoting of the linkage results in the cylinder 28 moving laterally outwardly and upwardly to the position illustrated in FIGURE 3. When the linkage has been pivoted as shown in FIGURE 3, further movement of the cylinder 28 is prevented as the result of the physical dimensions of the linkage. However, the leg 30 continues to move downwardly. Further downward movement of the leg 30 results in increased pressure being applied to the cam surface 96 with resultant pivoting of the cam and arm 88 away from the foot 86 to disengage the foot and permit the leg to be fully extended as illustrated in dotted lines in FIGURE 1. The legs of all of the jacks eventually engage the ground and lift the camper unit 10 off the truck 12 and permit the truck to be driven away. The pressure in the cylinder 28 may then be released permitting the camper to slowly move to rest on the ground.

When it is again desired to load the camper unit 10 onto the truck 12, the legs of the jacks are extended to raise the camper unit and permit its reloading onto the truck. When the pressure is again released in the cylinder 28, the spring 46 causes retraction of the jack legs.

When the foot 86 is retracted to a point where it engages the lower cam surface 96, the cam is swung outwardly to permit the foot to pass thereby. The cam surface 96 is relatively steep so that there will be no upward movement of the cam 84 and arm 88 upon upward movement of the leg 30. When the foot 86 has passed by the cam 84, it engages the lower surface of the stop 100. This causes reverse movement of the links 48, 50, 78 to move the cylinder and linkage back into the nested position illustrated in FIGURE 2.

Having thus described my invention, I claim:

1. A camper unit having a jack including a generally vertically extending support secured to one side thereof, a sleeve, an extensible leg in said sleeve, linkage means pivotally mounted on one end thereof on said support and movably connected to said sleeve on the other end thereof and means associated with said linkage means and said leg operable to move the entire sleeve laterally of said support upon extension of said leg.

2. A jack having a generally vertically extending mounting support, a sleeve carried by said support, an extensible leg movable in said sleeve, linkage means pivotally mounted on said support and slidably mounted on said sleeve, and means connected to said linkage means and leg to pivot the linkage means as the leg is extended to move the entire sleeve laterally from its support.

3. A jack having a generally vertically extending mounting support, a sleeve carried by said support, an extensible leg movable in said sleeve, linkage means pivotally mounted on said support and slidably mounted on said sleeve, and means connected to said linkage means and leg to pivot the linkage means as the leg is extended to move the entire sleeve laterally from its support, said means being operable to return said sleeve to its normal inactive position upon retraction of said leg.

4. A jack as defined in claim 3, and further characterized in that the means connected to said linkage means and leg to pivot the linkage means comprise a cam engaging said leg and operable to move said leg laterally of said support.

5. A jack as defined in claim 3, and further characterized in that said means connected to said linkage means and leg to pivot the linkage means as the leg is extended include a first cam engaging said leg and operable to move said leg laterally away from said support upon downward movement of the leg and a second cam engaging said leg upon retraction thereof to move said leg laterally towards said support upon upward movement of the leg.

6. A jack having a mounting support, a sleeve, means having elongated slots mounted on said sleeve, a stabilizing arm pivotally mounted on one end thereof on said support, means carried by said sleeve and extending through said elongated slots and being attached to the opposite end of said arm and means for moving said latter means in said slots to cause said sleeve to move laterally from said support.

7. A fluid operated jack comprising a mounting support, a cylinder, a combination piston and extensible leg in said cylinder, stabilizing arms movably mounted on said cylinder on one end thereof and pivotally mounted on the other end on said support, linkage means carried by said cylinder and connected to the ends of the stabilizing arms movably mounted on said cylinder and connected to said leg for movement with said leg to pivot said arms to move said cylinder laterally from said support and means for actuating said piston and leg.

8. A fluid operated jack comprising a mounting support, a cylinder, a combination piston and extensible leg in said cylinder, stabilizing arms movably mounted on said cylinder on one end thereof and pivotally mounted on the other end on said support, linkage means carried by said cylinder and connected to the ends of the stabilizing arms movably mounted on said cylinder and connected to said leg for movement with said leg to pivot said arms to move said cylinder laterally from said support, means for actuating said piston to extend said leg and means to retract said leg to actuate said linkage means to move said cylinder and leg to their normal inactive position.

References Cited by the Examiner
UNITED STATES PATENTS

| | | | |
|---|---|---|---|
| 2,546,203 | 3/1951 | Tucker | 254—86 |
| 2,555,336 | 6/1951 | Hagely | 254—86 |
| 2,837,312 | 6/1958 | Troche | 254—86 |
| 2,926,889 | 3/1960 | Obes | 254—86 |
| 2,934,373 | 4/1960 | Doty | 214—515 |
| 2,956,699 | 10/1960 | Payne | 254—45 X |
| 2,958,538 | 11/1960 | Norris et al. | 214—515 |
| 3,087,627 | 4/1963 | Bill | 212—145 |
| 3,175,698 | 3/1965 | Dassler | 212—145 |
| 3,243,161 | 3/1966 | Green | 254—45 |

WILLIAM FELDMAN, *Primary Examiner.*

MILTON S. MEHR, *Examiner.*